United States Patent [19]

Blechen et al.

[11] 4,044,975
[45] Aug. 30, 1977

[54] AIRCRAFT SPEED COMMAND SYSTEM

[75] Inventors: Frederick C. Blechen, Long Beach; Lloyd L. Roberts, Huntington Beach, both of Calif.

[73] Assignee: McDonnell Douglas Corporation, Long Beach, Calif.

[21] Appl. No.: 687,256

[22] Filed: May 17, 1976

[51] Int. Cl.² .................................................. G05D 1/08
[52] U.S. Cl. .................................. 244/181; 73/178 R; 235/150.2; 340/27 AT; 244/182; 340/27 SS
[58] Field of Search ............. 73/178 R, 178 T, 178 H; 235/150.2, 150.22; 244/181, 182, 188; 318/584; 340/27

[56] References Cited

U.S. PATENT DOCUMENTS

| 3,627,237 | 12/1971 | Smith | 244/181 |
| 3,641,323 | 2/1972 | Hughes et al. | 235/150.22 X |
| 3,901,466 | 8/1975 | Lambregts | 235/150.2 X |
| 3,920,966 | 11/1975 | Knemeyer et al. | 235/150.2 |
| 3,921,941 | 11/1975 | Lehfeldt | 235/150.2 X |
| 3,980,258 | 9/1976 | Simeon | 244/182 |

Primary Examiner—Stephen G. Kunin
Attorney, Agent, or Firm—Robert E. Cunha; Walter J. Jason; Donald L. Royer

[57] ABSTRACT

A system for displaying to the pilot an indication to enable him to fly to a desired air speed and angle of attack, especially on takeoff. An artificial angle of attack error signal is generated from actual and desired air speeds and corrected by adding to it a differentiated pitch signal. The resultant calculated angle of attack error is displayed to the pilot unless flying to that indication would result in exceeding the actual maximum or minimum angle of attack limits, in which case an indication based on the actual exceeded limit is displayed.

8 Claims, 4 Drawing Figures

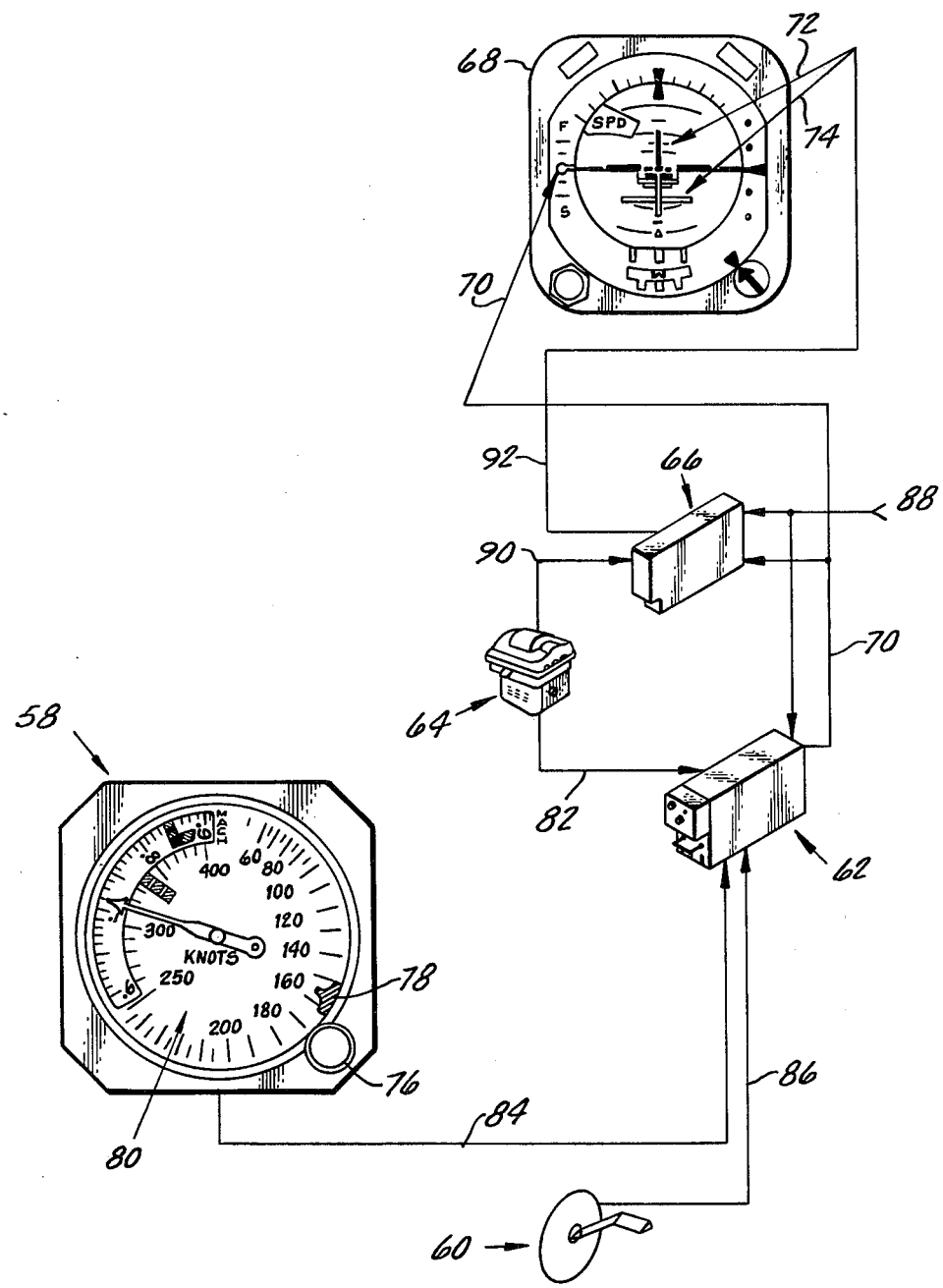
FIG_4

AIRCRAFT SPEED COMMAND SYSTEM

BACKGROUND OF THE INVENTION

This invention relates to aircraft speed command systems and, more particularly, to a system for displaying to the pilot an angle of attack (alpha) error indication to enable him to maintain a pre-selected airspeed during takeoff.

One of the typical instruments on a commercial air craft instrument panel is an attitude director indicator which has, among other things, a slow-fast indicator to indicate the aircraft speed with respect to some reference speed, and attitude director indicator command bar to indicate aircraft pitch command or angle of attack (alpha) information.

During takeoff, the aircraft speed is a function of pitch and angle of attack. That is, as the aircraft increases in pitch attitude, the aircraft speed will decrease. However, the aircraft speed must be maintained above the stall speed, and to guarantee a degree of safety, the attitude director indicator is preset to indicate to the pilot two visual indications relative to a reference speed which is a fixed percentage above stall speed or relative to a reference alpha.

One of these indicators is an attitude director indicator command bar, a horizontal bar which rises above or falls below a fixed line to indicate whether the aircraft angle of attack is respectively below or above the angle which would result in the aircraft just attaining the reference speed. The other indicator is the slow-fast indicator, a circular indicator which rises or falls against a fixed background and displays whether the aircraft speed is above or below the reference speed.

Thus, the indicator bar is a visual indication of the angular command for the aircraft while the slow-fast indicator is a visual indication of the speed of the aircraft.

In reaction to these speed and attitude indications, the pilot can push or pull the control wheel which changes the angle of the elevator in the tail assembly. This results in raising or lowering the nose of the aircraft and, thereby, decreasing or increasing the aircraft speed. In this way the pilot corrects for, or flies to, the attitude director indicators.

In a prior speed command system for use in commercial aircraft during landing, inputs to the system such as the actual angle of attack (alpha), a reference angle of attack (alpha reference), and an air speed error equaling the difference between actual and reference seeds are used as inputs to a computer, the output of which is the command bar or alpha error signal to the pilot as an indication for him to increase or decrease the aircraft angle of attack and, indirectly, the speed. The reference angle of attack is typically a maximum angle of attack which corresponds to the reference air speed which is a constant percentage above stall speed, and the output of the computer is a slow-fast indication to the pilot of the difference between the actual and reference alphas.

A second input to the speed command computer is an alpha error signal computed from air speed. For a given aircraft at typical landing speeds and loads, the air speed is a function of the angle of attack. Thus, if the difference between the minimum air speed and the actual air speed is multiplied by a constant, the results will be another alpha error signal.

Thus, two alpha error signals are generated; one from the difference between the angle of attack and the reference angle of attack, the other computed from the difference between the actual air speed and the reference air speed.

During landing, both of these inputs must be monitored. That is to say, if alpha becomes too great or if air speed is too low, an indication to the pilot to decrease the angle of attack will be issued by the speed control system. This is accomplished by monitoring both alpha error signals and generating a speed correction indication from the one which shows the worse case alpha error signal. In this way the speed command computer is continuously reacting to the more critical of the two error signals.

In adopting this prior system for the takeoff mode, a complication arises in that the error signal generated from air speed is not always correct. If the angle of attack is decreased, for instance, the difference between alpha and alpha reference will be immediately increased, but the air speed will be affected only gradually as the speed of the aircraft slowly increases in reaction to the decreased angle of attack. Thus, the error signal computed from the alpha angles leads the alpha error signal computed from air speed by a certain time constant. This transient error increases the amount of manual intervention required by the pilot and is therefore undesirable. This is especially true for use during takeoffs since the speed command indicator is constantly being monitored whereas in landing, for throttle control, it is intermittently monitored.

A second problem associated with this system for use during a takeoff is that aircraft frequently take off at speeds considerably in excess of the minimum speed upon which the reference angle of attack is based. This is necessary to allow the aircraft to take off with heavier loads or to allow the aircraft to take off at a speed which will allow it to maximize the altitude rate. In either of these cases the pilot needs a speed command othe than one based on a reference speed at a predetermined percentage above stall speed, and the speed command system described above does not provide this type of indication.

Further, a takeoff flight path may require a variable airspeed, but the above-described speed control system is limited to displaying an error based on a fixed reference speed.

SUMMARY OF THE INVENTION

The apparatus described herein produces an alpha error signal based on any air speed provided that the corresponding alpha is within high and low limits. This is accomplished by generating three alpha error signals and selecting one of them for an output as an alpha error signal.

The first alpha error signal is generated by a comparison between the actual angle of attack and a maximum angle of attack and corresponds to a speed which is a minimum constant percentage above stall speed. As will be explained in more detail below, the angle of attack is the angular difference between the direction of the air flow and the main horizontal plane of the aircraft. It can also be defined as the difference between the aircraft flight path and pitch attitude. Decreasing alpha results in an increase of aircraft speed.

In a similar manner a second alpha error signal is generated by comparing the actual angle of attack with a minimum angle of attack reference and corresponds to the slowest rate of climb allowable and to the maximum percentage above stall speed.

A third alpha error signal is generated by multiplying the difference between actual and reference air speeds by a suitable constant. However, in contrast to the prior art, this alpha error signal is corrected to account for the fact that air speed error lags the actual angle of attack by a particular time constant determined by the characteristics of the given aircraft. To compensate for this delay error, an electrical signal proportional to the aircraft pitch attitude is applied to a high pass filter, the output of which is summed together with the alpha error generated from the air speed error. In operation, as the pitch of the aircraft is changed from a smaller angle to a larger angle, the change of pitch will be felt immediately through the high pass filter and into the summing junction. This will change the alpha error immediately, which is the desired result. With the passage of time, the air speed will gradually begin to show the effects of the change of pitch, and the alpha error from this course will slowly reach an accurate value while the filter output will go to zero. The time constant of the pitch high pass filter is adjusted so that the output from the filter will exactly cancel the error caused by the delay in air speed so that the alpha error output generated from the air speed will always be accurate.

This corrected alpha error as generated from air speed date, and the alpha errors computed from minimum and maximum alphas, are applied to a selector which determines which of the three alpha errors will be displayed to the pilot.

The output of the selector will display the alpha error based on a comparison of the desired air speed and the actual air speed unless maintenance of this air speed would result in an alpha angle greater than the maximum safe angle of attack or less than the minimum safe angle of attack. In the latter two cases, the desired air speed is disregarded and an error signal based on the appropriate reference is displayed. In other words, the display to the pilot will show an alpha angle based on the desired air speed unless that would result in an alpha angle above or below the pre-established limits.

Further, the desired air speed can be varied during takeoff and the system will compensate automatically, displaying an appropriate speed command to the pilot at all times.

It is thus an object of this invention to provide a speed control system which can be preset to generate an alpha error signal based on a desired air speed provided that the resultant angle of attack falls between accepted limits. If these limits are exceeded, then the speed control system automatically generates an error based on the limit that was exceeded.

It is a further object of this invention to provide a speed command system comprising an alpha error generating circuit where said alpha error is generated from the difference between desired air speed and actual air speed and wherein this generated alpha error signal is compensated for a delay in air speed as a function of a change in angle of attack by introducing a correction signal generated by passing an electrical signal proportional to the aircraft pitch attitude through a high pass filter, the characteristics of said filter being appropriate exactly to cancel the delay error introduced by the lagging air speed.

It is a further object of this invention automatically to generate speed command indicators based on variable air speeds.

It is a further object of this invention to provide a speed command system for use during landings as well as takeoffs.

BRIEF DESCRIPTION OF THE DRAWINGS

FIG. 4 is a simplified system drawing of the speed command system in which the speed command computer is used.

DESCRIPTION OF THE PREFERRED EMBODIMENT

Figure 1:
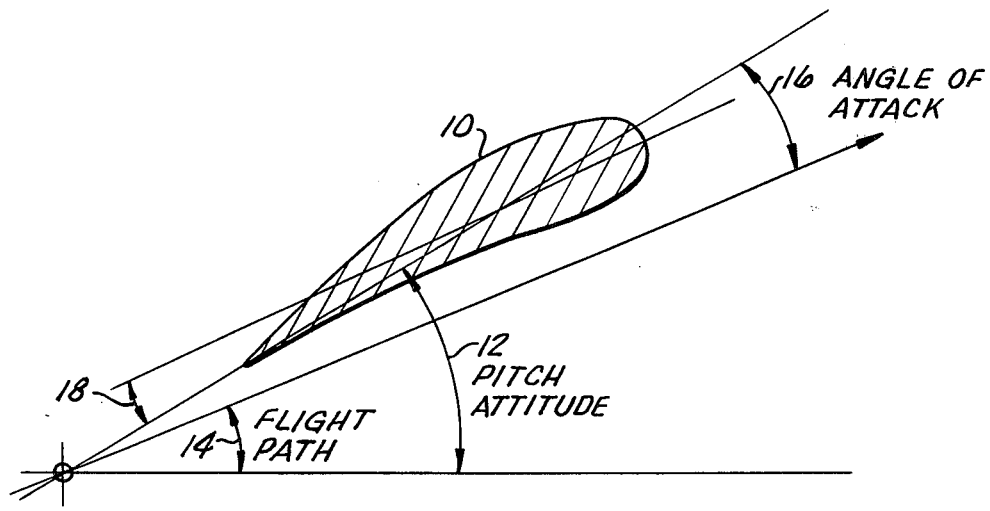
FIG. 1 is a diagram of the various aircraft angles.

FIG. 1 is a simplified drawing of the angles required for a discussion of the motion of an aircraft during takeoff. The aircraft wing 10, shown in cross section, has a central line from trailing to leading edges, called a chord, which defines the plane of the wing. On takeoff this line also defines the aircraft pitch attitude 12. However, because the aircraft is always slipping downward, the actual flight path 14 is always angularly smaller than the pitch attitude 12. The amount of angular slip, or the difference between pitch attitude and flight path, is called the angle of attack 16, or alpha, and also represents the angular difference between the air flow and the wing chord. There is also an angular difference 18 between the longitudinal axis of the fuselage and the wing chord, but it will not be used in this discussion since all angles are defined in relation to the wing. It should be pointed out that fuselage angle of attack could just as well be used as wing angle of attack.

Figure 2:
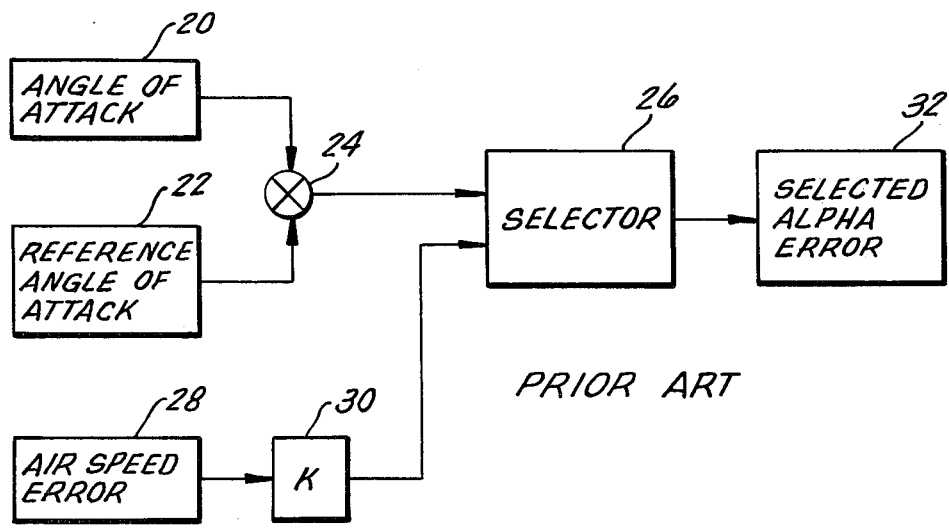
FIG. 2 is a block diagram of a prior art speed command computer.

In a prior speed command system used in landing and represented in FIG. 2, the angle of attack 20 and the reference angle of attack 22 are fed into a summing junction 24 which applies the difference to the selector 26. At the same time, an air speed error signal 28 which represents the difference between a reference air speed and the actual air speed is multiplied by an appropriate constant 30 and is applied as a second input to the selector 26. The dimensions of both inputs to the selector 26 are in the form of a delta alpha signal with angular dimensions. The selector selects the worse case and uses it as a selected alpha error signal 32 which eventually is translated into a visual indication to the pilot telling him whether to increase or decrease the aircraft angle of attack. As stated above, this system is deficient in that the maximum alpha is the only reference available to the pilot. The system does not take into consideration an optimum or a minimum alpha. Also, the system does not compensate for the time delay of air speed as a reaction to a change of pitch.

Figure 3:
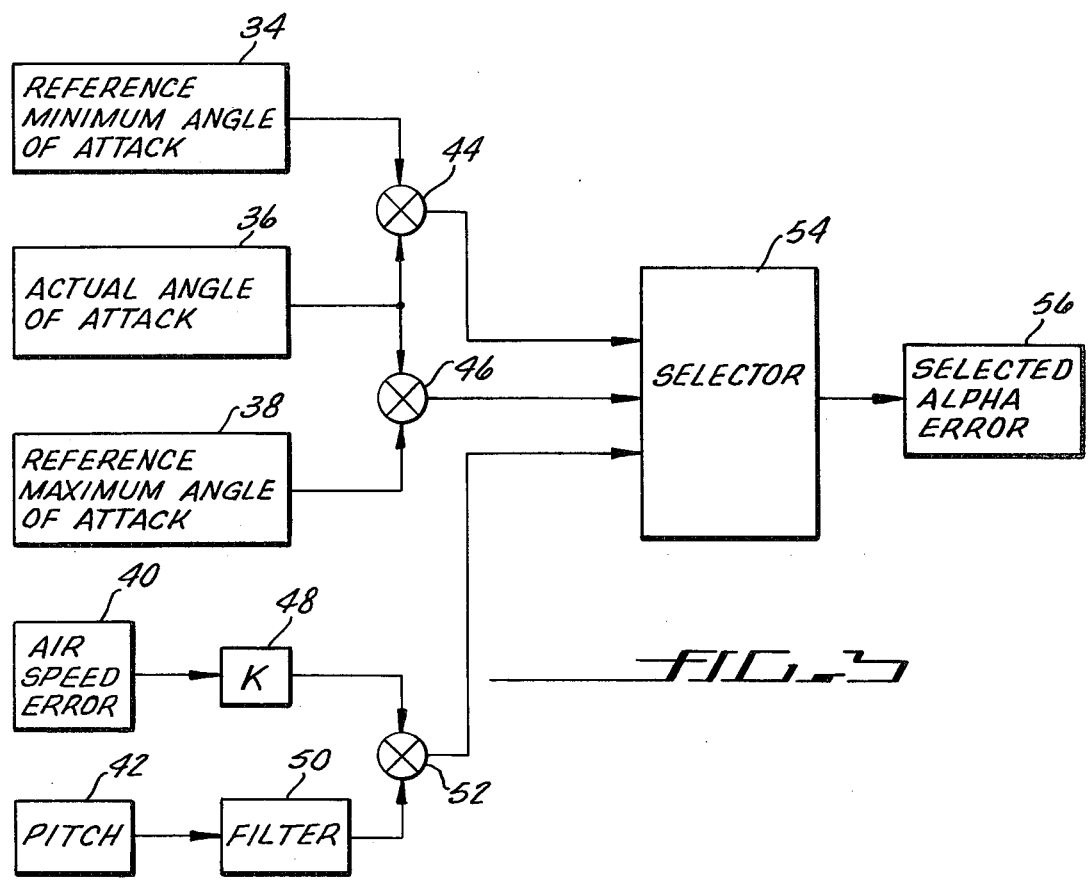
FIG. 3 is a block diagram of the instant speed command computer.

FIG. 3 represents a block diagram of the present invention, a speed command system for use during takeoffs. The actual angle of attack 36 is compared, as in the prior art, to the maximum angle of attack 38, and the difference generated in summing junction 46 is applied as one input to the selector 54. In a similar manner, the actual angle of attack 36 is compared with the minimum angle of attack 34 in summing junction 44 and is applied as another input to selector 54.

A third delta alpha signal is generated as follows. First, an air speed error 40, multiplied by an appropriate constant 48, is applied to a summing junction 52. The air speed error is a difference between the reference air speed and the actual measured air speed. During takeoff, the air speed is usually a linear function of alpha and thus the air speed error may be converted to a delta alpha by multiplication with a suitable constant 48. As stated above, the alpha error signal computed in this manner lags the actual delta alpha by a certain time constant. This lag is corrected for by applying the aircraft pitch attitude 42 through a high pass filter 50 to the summing junction 52. As pitch is varied, the effect will be immediately applied through high pass filter 50 to the summing junction 52 but, as pitch remains for some length of time at its new setting, the output of high pass filter 50 will go to zero. The output of filter 50 is therefore a differentiated pitch signal with a time constant designed exactly to cancel the alpha error which is produced from the delayed change in air speed. Thus, the output of summing junction 52 is an alpha error signal based on the air speed, and corrected for the air speed delay resulting from a change of pitch.

The three alpha error signals are applied to the selector 54 which selects one as an output to the aircraft instrumentation. The alpha error computed from air speed will be selected, unless flying to that indication results in the aircraft exceeding the minimum or maximum alpha. In a case where one of these two limits is exceeded by any of the three alpha error signals, the worst one will be selected by selector 54 for use as the selected alpha error. Thus, the selector will select the lower signal when any represent an alpha less than minimum, the higher signal when any represent an alpha greater than maximum, and the alpha generated from air speed at all other times.

The air speed error is generated by a comparison of an actual air speed with a reference air speed. In fact, this reference air speed may be variable and the remainder of this system will automatically provide appropriate speed commands to enable the pilot to fly accordingly.

The actual circuits required to implement these blocks diagrams are well known in the art. See, for instance, the "Handbook of Operational Amplifier Applications," printed in 1963, by Burr-Brown Research Corporation, Tucson, Az., which describes the circuits and analog computer systems that may be implemented from operational amplifiers and similar components.

FIG. 4 is a simplified drawing of the speed command system of which the speed command computer is a part.

The air speed error is produced by an air speed indicator 58. This indicator has a radial face marked in air speed knots and an actual air speed dial 80 to register speed. In addition, a pilot reference speed select knob 76 is provided. It is mechanically coupled to a reference speed indicator 78 which is set by the pilot to the desired takeoff speed. The instrument itself then generates an electrical signal proportional to the difference between the desired and actual speeds, which is one input to the speed command computer 62.

Another input to the speed command computer is supplied by an angle of attack sensor 60 which comprises a vane protruding into the air stream. This is adjusted to generate a signal proportional to the angular difference between air stream and wing angle, which is the angle of attack (alpha).

The vertical gyro 64 is a gyro stabilized platform suspended from the aircraft body by two gimbals. As the aircraft attitude varies, the angular differences are taken from the gimbal pickoffs and supplied to the system as pitch and roll signals.

the speed command computer 62 receives the pitch 82, air speed error 84 and alpha 86 signals and processes them in accordance with the discussion of FIG. 3. In addition, the maximum and minimum reference speeds are stored internally in the speed command computer. The selected output error from the computer 62 is supplied as a slow-fast signal 70 directly to the attitude director indicator 68.

The flight director computer 66 receives a speed command mode control signal 88 (takeoff, go-around or approach) and uses it to condition and set the gain of its inputs and outputs accordingly. The inputs are the slow-fast signal 70 and roll 90, and the outputs are the pitch and roll commands 92 which drive the pitch 74 and roll 72 command bars of the attitude director indicator 68.

The pilot, by nulling or flying to the indicated air speed or pitch attitude indicator, will automatically maintain the reference air speed, provided that the maximum and minimum alpha angles are not exceeded.

While an exemplary embodiment of this invention has been described above and shown in the accompanying drawings, it is to be understood that such embodiment is merely illustrative of, and not restrictive on, the broad invention and that we do not wish to be limited in our invention to the specific construction or arrangement described and shown, for various obvious modifications may occur to persons having ordinary skill in the art.

We claim:

1. Apparatus for generating an angle of attack (alpha) error signal comprising:
   means for generating a first signal proportional to a difference between a minimum angle of attack (alpha) and an actual alpha,
   means for generating a second signal proportional to a difference between a maximum alpha and an actual alpha,
   means for generating a third signal proportional to a difference between actual and reference aircraft speeds, and
   selector means for transmitting as an output
   a. the lower of said first and third signals when either represents an alpha less than minimum alpha,
   b. the higher of said second and third signals when either represents an alpha greater than maximum alpha, or
   c. said third means at all other times.

2. The apparatus of claim 1 wherein said third means further comprises:
   filter means for filtering a signal proportional to aircraft pitch and for adding said filtered signal to said third signal to compensate said third signal for a lag in air speed as a reaction to a change of pitch, and thereby to allow said third signal to conform more accurately to actual aircraft alpha error.

3. In an aircraft speed command system for generating an aircraft angle of attack (alpha) error signal, the improvement comprising
   a summing junction for receiving signals proportional to actual and minimum alpha and for generating a first alpha error signal proportional to the difference therebetween,
   a summing junction for receiving signals proportional to actual and maximum alpha and for generating a second alpha error signal proportional to a difference therebetween, an air speed error means for generating a signal proportional to the difference between actual and reference air speeds, and for multiplying by a suitable constant to generate a third alpha error signal, and a selector for receiving said first, second, and third alpha error signals, and for transmitting
  a. the lower of said first and third signals when either represents an alpha less than minimum alpha,
  b. the higher of said second and third signals when either represents an alpha larger than maximum alpha, or
  c. said third signal at all other times.

4. In an aircraft speed command system for generating an aircraft angle of attack (alpha) error signal, the improvement comprising:
  a summing junction for receiving signals proportional to actual and minimum alpha and for generating a first alpha error signal proportional to the difference therebetween,
  a summing junction for receiving signals proportional to actual and maximum alpha and for generating a second alpha error signal proportional to the difference therebetween,
  means for generating an air speed error signal proportional to a difference between actual and reference air speeds,
  a multiplying means for multiplying said air speed error signal by a suitable constant to convert it to a calculated alpha error signal,
  a high pass filter for receiving and filtering a signal proportional to aircraft pitch wherein said filter time constant is chosen so that the decay time of said filtered signal in response to a change of aircraft pitch is approximately equal to the time required for said aircraft to change speed in response to said change of pitch,
  a summing junction for receiving said calculated alpha error signal and said filtered pitch signal and generating therefrom a third alpha error signal corrected for said delay in air speed due to a change in pitch, and
  a selector for receiving said first, second, and third alpha error signals, and for transmitting
    a. the lower of said first and third signals when either represents an alpha less than minimum alpha,
    b. The higher of said second and third signals when either represents an alpha greater than maximum alpha, or
    c. said third signal at all other times.

5. An aircraft speed command system for generating an aircraft angle of attack (alpha) error signal, the improvement comprising:
  means for generating a signal proportional to the actual alpha,
  circuits for storing data corresponding to the minimum and maximum alpha, and for generating signals proportional thereto,
  a summing junction for receiving said signals proportional to the actual alpha and minimum alpha and for generating a first alpha error signal proportional to a difference therebetween,
  a summing junction for receiving said signals proportional to the actual alpha and maximum alpha and for generating a second alpha error signal proportional to a difference therebetween,
  an air speed error generator for generating a third alpha error signal proportional to the difference between the actual and reference air speeds, and
  a selector for receiving said first, second, and third alpha error signal, and for transmitting
    a. the lower of said first and third signals when either represents an alpha less than minimum alpha,
    b. the higher of said second and third signals when either represents an alpha larger than maximum alpha, or
    c. said third signal at all other times.

6. The apparatus of claim 5 further comprising:
  a gyro stabilized platform for generating a signal proportional to the aircraft pitch, and
  a high pass filter for receiving and filtering said aircraft pitch signal wherein said filter time constant is chosen so that the decay time of said filtered pitch signal is approximately equal to the time required for said aircraft to change speed in response to said change of pitch, and for adding said filtered pitch signal to said third alpha error signal prior to said third alpha error signal being received by said selector.

7. The method of generating an aircraft angle of attack (alpha) error signal, comprising:
  generating a first signal proportional to the difference between actual and minimum alpha,
  generating a second signal proportional to the difference between actual and maximum alpha,
  generating a third signal proportional to the difference between actual and reference air speeds, and
  selecting for output as an alpha error signal
    a. the lower of said first and third signals when either represents an alpha smaller than minimum alpha,
    b. the higher of said second and third signal when either represents an alpha greater than maximum alpha, or
    c. said third signal at all other times.

8. The method of claim 7 including the step of correcting said third signal by filtering a signal proportional to pitch and adding it to said third signal to compensate for a lag in air speed due to a change of pitch to conform said third signal more accurately to a difference between actual and reference alpha.

* * * * *

UNITED STATES PATENT OFFICE
CERTIFICATE OF CORRECTION

PATENT NO. : 4,044,975
DATED : August 30, 1977
INVENTOR(S) : Frederick C. Blechen, Lloyd L. Roberts It is certified that error appears in the above-identified patent and that said Letters Patent are hereby corrected as shown below:

Column 1, line 50, delete [seeds] and insert speeds therefor

Column 2, line 37, delete [othe] and insert other therefor;

Column 3, line 27, delete [date] and insert data therefor;

Column 6, line 1, first occurrence, delete [the] and insert The therefor.

Signed and Sealed this

Thirtieth Day of May 1978

[SEAL]

Attest:

RUTH C. MASON
Attesting Officer

LUTRELLE F. PARKER
Acting Commissioner of Patents and Trademarks